3,278,515
ORGANO AZO, ANTHRAQUINONE AND PHTHALOCYANINE DYESTUFFS
Wilhelm Schmidt-Nickels, Little York, N.J., assignor to General Aniline & Film Corporation, New York, N.Y., a corporation of Delaware
No Drawing. Filed Dec. 31, 1962, Ser. No. 248,243
9 Claims. (Cl. 260—163)

This invention relates to a novel fiber-coloring process, and to a novel group of chromophoric compounds useful in such process.

A number of dyeing processes are known in which dyeings of improved fastness properties are obtained by reaction between the dyestuff and the fiber. Among the large number of types of reactive dyes proposed for use in such processes, only a few are commercially useful. These are the cyanuric, the pyrimidine, and the vinylsulfone or sulfatoethylsulfone types. Because of the relative scarcity of such dyestuffs and/or their substantial unavailability to large sections of the dyeing trade and/or various disadvantages inherent in their use with respect to procedure, cost, and/or results obtained, there exists a definite need in the industry for new and improved types of reactive dyestuffs and/or methods of dyeing therewith.

It is an object of this invention to provide a novel process for coloring fibers and other articles in any desired shades of improved fastness properties. Another object of this invention is the provision of a novel group of chromophoric compounds useful in such process. Still another object of this invention is the provision of methods for making such chromophoric compounds. A further object of this invention is the provision of novel colored fibers. Still further object of this invention is the provision of such processes, compounds, and colored products, which will not be subject to one or more of the above disadvantages and which depend upon a reaction between the chromophoric compound and the fibers. Other objects and advantages will appear as the description proceeds.

The attainment of the above objects is made possible by this invention which is based upon the discovery that colored fibers with improved properties can be obtained by treating fibers containing a reactive hydrogen atom in the presence of an acid binding agent with an organic dyestuff containing in the molecule at least one radical which is bonded to a nuclear carbon atom and which has the formula (I)    —CH$_2$—OOC—(CHY)$_m$—X wherein Y is selected from the group consisting of H and lower alkyl of 1 to 4 carbon atoms, m is an integer from 1 to 3, and X is the anion of a strong acid having a dissociation constant greater than $2.0 \times 10^{-5}$. The fiber-reactive radical shown in the above formula has been found to be unexpectedly effective in enabling reaction of chromophoric compounds (including dyestuffs per se) containing the same with fibers containing a reactive hydrogen atom in the fiber molecule with liberation of HX and the production of colored fibers with improved properties with respect to fastness to such deteriorating influences as wet treatments, alkaline and acid conditions, laundry sours, chlorine, and /or light and the like. The present invention accordingly not only resides in the provision of the foregoing process and the colored fibers resulting therefrom, but also in the provision of the chromophoric compounds useful in such process.

As a chromophoric compound into which such fiber-reactive radical or radicals may be inserted in accordance with this invention there may be employed any known organic dyestuff. Such dyestuffs are generally of aromatic character in containing at least one carbocyclic or heterocyclic ring, and may generally be selected from among dyestuffs of the azo, quinoid (including anthraquinone, dibenzanthrone, other polycyclic ketones and substituted derivatives thereof), indigoid, thioindigoid, di- and tri-aryl (e.g. phenyl) methane, nitro, phthalocyanine, stilbene, and sulfur dyestuffs. Venkataraman's "Chemistry of Synthetic Dyes," Academic Press, N.Y., 1952, Volumes I and II, discloses a multitude of such organic dyestuffs into which such fiber-reactive radicals of the formula shown above can be inserted in known manner. Further examples of dyestuffs into which the above defined fiber-reactive radicals may be inserted are also disclosed generically and specifically in, for example, U.S. Patents 2,657,205, 2,892,670, 2,892,671, 2,928,711, 2,940,-812, 2,978,289, 3,029,123, 3,031,252, and 3,042,477, and such disclosures, so far as they relate to chromophoric compounds or dyestuffs into which fiber-reactive groups may be inserted, are incorporated herein by reference thereto.

Optionally, the chromophoric compounds into which the above defined fiber-reactive radical or radicals are inserted may be colorless compounds containing groups enabling conversion to colored compounds or dyestuffs in situ on the fiber, as for example, a group promoting coupling with a diazotized primary aromatic amine or a diazotizable primary amine group whereby the color may be produced in situ on the fiber after reaction of the fiber-reactive radical-containing chromophoric compound with the fiber by suitable development as by, respectively, reaction with a diazotized primary aromatic amine or diazotization and reaction with a coupling component. Other mechanisms and/or groupings are of course known for developing color in situ on the fiber, including metallizing, reducing and/or oxidizing treatments and the like. It is to be understood that such colorless compounds are to be considered equivalent to the above described dyestuffs in carrying out the teachings of this invention.

In the above defined fiber-reactive radical Y is preferably H but may instead be methyl to butyl or isomers thereof. X is an ester group derived from the anion of a strong acid having a dissociation constant greater than $2.0 \times 10^{-5}$ and is preferably Cl or sulfato (—OSO$_3$H). Alternatively, X may represent the anion of any other such strong acid such as the anions of hydrobromic, hydrofluoric, iodic, phosphoric, phosphonic, phosphinic, organic sulfonic (sulfonyloxy), trichloroacetic, dichloroacetic, chloracetic, formic acids and the like.

Bonding of the above described fiber-reactive radical to a nuclear carbon atom of an organic dyestuff or chromophoric compound may be conveniently carried out by chloromethylation in known manner followed by reaction of the chloromethylated dyestuff or chromophoric compound with a hydroxylated carboxylic acid salt of the formula (II)    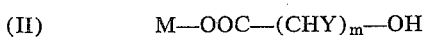M—OOC—(CHY)$_m$—OH wherein M is any alkali metal, preferably sodium or potassium, in an amount molecularly equivalent to the number of CH$_2$Cl groups in the dyestuff or chromophoric compound, with liberation of MCl, and then subjecting the resulting compound to esterification with a strong acid HX as defined above to replace the OH group of the compound II moiety by X.

The hydroxylic, carboxylic acid salt of the formula M—OOC—(CHY)$_m$—OH, wherein M is any alkali metal but preferably potassium or sodium, are known compounds and/or are prepared in known manner. Thus, the alkali metal salt of gamma-hydroxybutyric acid is prepared by treatment of gamma-butyrolactone, or lower alkyl substituted derivatives thereof, with an aqueous alkali metal hydroxide solution. Similarly, the alkali metal salt of β-hydroxypropionic acid is prepared by like treatment with β-propiolactone or its lower alkyl substituted derivatives. The alkali metal salts of glycolic acid or lower alkyl substituted derivatives thereof may also be employed for reaction with the chloromethylated precursor.

A preferred expedient in the production of the present chromophoric compounds and dyestuffs involves reaction of the compound of Formula II in similar manner with a chloromethylated nitro-aromatic compound such as benzene, diphenyl, diphenyl ether, naphthalene, anthracene, and halogen, lower alkyl and alkoxy substituted derivatives thereof (1 to 4 carbon atoms), and the like, all additionally containing a nuclearly substituted $NO_2$ group, with liberation of MCl. Such a reaction as applied to chloromethylated nitrobenzenes, the resulting products and reduced and/or esterified derivatives thereof are disclosed and claimed in my copending application S.N. 248,251, filed on even date herewith and entitled "Chemical Compound," and now Patent No. 3,193,569. The above reaction is preferably carried out in the presence of a polar organic solvent. The intermediate resulting from the above reaction is then subjected to reducing conditions as for example by catalytic hydrogenation in known manner to produce the corresponding free amino-containing compound of the formula:

(III)  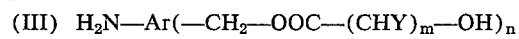
$H_2N—Ar(—CH_2—OOC—(CHY)_m—OH)_n$ wherein Ar represents the nuclear residue of the above mentioned chloromethylated nitroaromatic compound, preferably benzene, and $n$ represents the number of $CH_2Cl$ groups originally present therein, usually 1 or 2.

The above intermediate of Formula III may be employed in a number of different ways in carrying out the teachings of the present invention. For example, it is readily diazotized and coupled in known manner, before or after esterification to replace the terminal OH groups by X, with any desired azo coupling component, a multitude of which are known in the art and disclosed for example in the above cited Venkataraman reference, to produce azo dyestuffs of the formula:

(IV)  
$B—N=N—Ar(—CH_2—OOC—(CHY)_m—X)_n$ wherein B is the residue of the azo coupling component. The resulting azo dyestuff is readily reacted with fibers containing a reactive hydrogen atom in the presence of an acid binding agent with liberation of HX and the production of colored fibers represented by the formula:

(V)  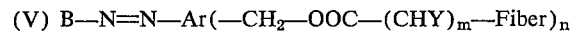
$B—N=N—Ar(—CH_2—OOC—(CHY)_m—Fiber)_n$ wherein "Fiber" represents a reactive hydrogen-containing fiber molecule deprived of said reactive hydrogen atom. Dyestuffs or chromophoric compounds containing a plurality of fiber-reactive radicals, when applied to fibers in accordance with the present invention enable the attainment of further improved fastness properties in the colored products due to cross-linking between the fibers. In general, the colored fibers produced by the present process may be represented by the formula:

(VI)  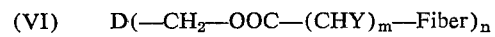
$D(—CH_2—OOC—(CHY)_m—Fiber)_n$ wherein D represents the chromophoric compound (e.g. organic dyestuff molecule), a nuclear carbon atom of which is bonded to the parenthetical group shown, Y, $m$ and "Fiber" are as defined above, and $n$ has an average value of 1 to 4.

As stated, any azo coupling component may be employed to provide the B component in the azo dyestuffs of Formula IV above. The identity and characteristics of such coupling components have been well documented, as for example see Volume I of Venkataraman, cited above, beginning at page 409. Generally, such compounds are capable of coupling by reason of an anionoid or nucleophilic center in the compound at which coupling with the diazo component takes place. An important group of azo coupling components are the carbocyclic and heterocyclic compounds containing a nuclearly substituted hydroxy or amino group directing coupling in ortho or para position thereto. Usually, the diazonium coupling reaction with these coupling components is explicable by a mechanism which is in consonance with the accepted theory of aromatic substitution. The yield in the coupling reaction depends on the electro-negativity and accessibility of the site in the carbocyclic or heterocyclic compound at which the attachment of the diazonium group is to take place and on the pH of the reaction mixture which may fall within the acid, neutral or basic range depending upon the particular coupling component employed. The diazonium group attacks a position which has been activated as a site of high electron density. Coupling therefore takes place in the ortho or para position to the directing hydroxyl or amino group in the coupling component. If both of these positions are occupied, no coupling will take place or one of the substituents will be displaced.

Another important group of azo coupling components are the heterocyclic compounds containing a reactive nuclear methylene group usually associated with an adjacent keto group (keto-methylene linkage) as in the 5-pyrazolones.

Still another important group of azo coupling components are the compounds containing an aliphatic or alicyclic keto-methylene group as in the acylacetic acid arylides and esters.

As examples of suitable azo coupling components falling within the above classifications, there may be mentioned aniline, toluidine, 2-naphthylamine, 2-naphthol, 1-amino-7-naphthol, and other amino and/or hydroxy containing benzenes, naphthalenes and other mono- and poly-carbocyclic and -heterocyclic aromatic compounds including pyrroles, indoles, 2-hydroxycarboazoles, 3-hydroxydibenzofurans, 2-naphthol-3-carboxylic acid arylamides, amino and hydroxy pyridines and pyrimidines, 2-4-dihydroxyquinoline, 9-methylacridine, 5-pyrazolone, 1-phenyl-3-methyl-5-pyrazolone, 1-phenyl-5-pyrazolone-3-carboxylic acid, acetoacetic acid anilide, benzoylacetic acid anilide, and substituted, fused ring, and other derivatives thereof. Such coupling components may contain any desired auxochrome substituents, solubilizing groups, and the like.

In its preferred embodiment, the fiber-reactive chromophoric compounds of the present invention are water soluble (including ready dispersibility in water) to facilitate application thereof to the fiber from an aqueous medium. It is accordingly preferred that such fiber-reactive chromophoric compounds contain at least one ionogenic water-solubilizing group, preferably a sulfonic acid group although other such groups are known and may be employed as for example carboxylic, sulfato, sulfatoethoxy, phosphatoethoxy, and the like. Thus, in the production of the azo dyestuffs of Formula IV above, it is convenient to employ an azo coupling component B as described above containing such water-solubilizing group or groups. Alternatively, such water-solubilizing groups may be inserted into the fiber-reactive chromophoric compound previously or subsequently and/or as a final step as by sulfonation in known manner, etc.

Still another method of making the fiber-reactive chromophoric compounds of the present invention involves reaction of the compound of Formula III with a chromophoric compound or dye-stuff containing a reactive chlorine or bromine atom which may be nuclearly bound or present in a reactive radical such as a sulfonyl chloride group ($—SO_2Cl$), a chloromethyl group ($—CH_2Cl$), etc. in the presence of an acid binding agent, followed by esterification. For example, the compound of Formula III may be reacted with any reactive chlorine-containing compound adapted for subsequent conversion to a chromophoric compound or dyestuff in substance or on the fiber as for example a diazo component or an azo coupling component of an azo dyestuff, or with any known reactive bromine- or chlorine-containing chromophoric compound or dyestuff of the type described above. Thus, reaction of a compound of Formula III, produced for example by reduction of the reaction product of 2 moles of compound II with 2,6-bischloromethyl-4-nitrotoluene, with bromamine acid, preferably in the presence of an acid binding agent, followed by esterification with HX such as HCl, H₂SO₄ or equivalent yields a fiber-reactive anthraquinone dyestuff operative herein having the formula:

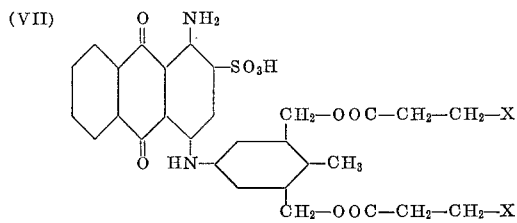

It will be understood that the phenylene ring in the above formula may be instead any other aromatic compound Ar of the type described above, as for example a divalent diphenyl, diphenyl ether, naphthalene, anthracene or other polycyclic aromatic compound, and halo, lower alkyl and alkoxy substituted derivatives thereof (methyl, isobutyl, methoxy, butoxy, etc.).

Similarly, reaction of two moles of the same compound of the Formula III, (using potassium β-hydroxypropionate as compound II) with one mole of tetrachlorosulfonated copper phthalocyanine followed by esterification with HX or equivalent yields, for example, the water soluble fiber-reactive phthalocyanine of the formula:

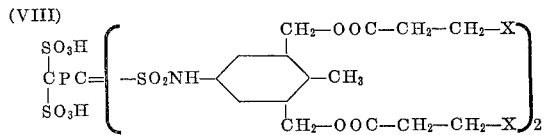

wherein CPC represents the copper phthalocyanine molecule.

In a similar manner, when the foregoing procedure is repeated using 3,6 - bischloromethyl-4-methoxy-1-nitronaphthalene instead of the bischloromethyl nitrotoluene, and bis-chloromethyl copper sulfophthalocyanine instead of the tetrachlorosulfonated copper phthalocyanine, there is produced a fiber-reactive water soluble phthalocyanine dyestuff of the formula:

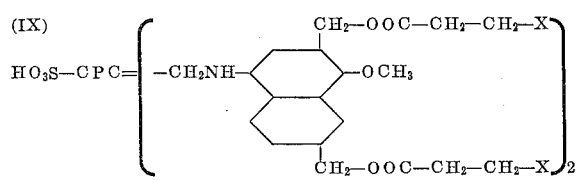

The fiber-reactive chromophoric compounds of the present invention are highly effective for coloring natural and synthetic fibers, preferably those containing an active H atom in the molecule, particularly cellulosic textile fibers, in any desired shades of good to excellent fastness and stability properties. The preferred coloring process involves dyeing (including printing) the fibrous materials by application thereto under acid-binding conditions of an aqueous medium containing a chromophoric compound of the invention (preferably water soluble) at any temperature ranging from ambient temperatures to the boiling point of the medium, said compound thereby reacting with the fiber with liberation of acid HX. The medium may have a pH ranging from about 4 to 14 although alkaline conditions are preferred. The medium may be applied in any desired manner, by continuous or batch methods and by immersion, roller application, padding, spraying, brushing, printing or the like. The aqueous medium is preferably a true or colloidal solution, but may also be in the form of a fine dispersion. It will accordingly be understood that the term "water soluble" as applied to the fiber-reactive chromophoric compounds herein is also intended to include ready water dispersibility, particularly since most such compounds and dyestuffs, though of high molecular weight and limited water solubility, are applied at relatively low concentrations to the fiber.

The fiber-reactive chromophoric compounds of this invention are applied to the fiber in any desired proportions depending upon the particular compound and fiber, and the depth of shade desired, generally ranging from about 0.5 to 5% based upon the weight of the fiber in the case of overall dyeings. Similarly, for overall dyeing of the fibrous material, the fiber-treating medium will generally contain the fiber-reactive chromophoric compound in a concentration ranging from about 0.5 to 10% or more.

It will be understood that the water in the above described aqueous medium may be replaced in whole or in part by a water miscible, polar organic solvent such as acetone, alcohol, dioxane, dimethylformamide, or the like without departing from the scope of this invention. It will likewise be understood that the medium containing the reactive chromophoric compounds described above may contain adjuvants commonly used in dyeing processes as for example solution aids such as urea and thiodiglycol, migration inhibitors such as cellulose ethers, sodium chloride, sodium sulfate and other salts, wetting agents preferably of the nonionic surface active type as produced for example by polyoxyethylenation of such reactive hydrogen-containing compounds as higher molecular weight alcohols, phenols, fatty acids, and the like, and thickening agents for the production of printing pastes such as methyl cellulose, starch, gum arabic, gum tragacanth, locust bean gum, sodium alginate, and the like.

The reaction between the reactive chromophoric compound and the fiber containing a reactive hydrogen atom involves liberation of acid HX and the reaction is accordingly favored by acid binding conditions. As acid binding agents which may be added to the medium containing the reactive chromophoric compound, there may be mentioned generally alkali metal (sodium, potassium, lithium, etc.) hydroxide, carbonate, bicarbonate, phosphate, silicate, borate, acetate or the like, or an organic base such as triethanolamine or the like, in an amount sufficient to neutralize the liberated HX in whole or in part. Such amount may range from less than 0.5% up to 10% in the dispersion.

Instead of adding the acid binding agent to the medium containing the fiber-reactive chromophoric compound, said agent may be applied to the fiber prior to or subsequent to treatment with said medium, the important factor being the treatment of the fibers with the fiber-reactive chromophoric compound in the presence of the acid binding agent. Alternatively, instead of the acid binding agent, a substance may be employed which liberates an acid binding agent upon subsequent subjection to elevated temperatures. An example of such a substance is sodium trichloroacetate, and the use of such a substance requires subsequent application of elevated temperatures such as by dry heat or steam.

In carrying out the coloring process, the speed of reaction between the fiber and the fiber-reactive chromophoric compound will generally vary directly with the temperature. The fiber, for example in the form of a fabric, may be continuously padded with the fiber-treating medium, and then, if desired after a gentle squeezing, may be wound on a roller with alternating sheets of polyethylene film, and/or the entire roll wrapped in a polyethylene package, and the package held at room temperature or slightly higher until completion of the desired reaction between the fiber and the reactive chromophoric compound has taken place. This may require several hours or more. Alternatively, the fiber may be allowed to remain in the fiber-treating medium at room or elevated temperatures up to the boiling point of the medium until the coloring process is completed which may range from 20 minutes or less to several hours or more. Preferably, the fiber is continuously padded with the fiber-treating medium, squeezed to, for example, a 50 to 200% liquor pickup, dried and heated at 90 to 350° C. for an hour or more to 30 seconds or less. A dry heat treatment may be substituted by a steaming or the like if desired.

The process of this invention has been found to be highly effective for dyeing and printing cellulosic fibers of natural or synthetic type, such as cotton, linen, wood, paper, regenerated cellulose and the like in any desired shades of good to excellent fastness properties. As a result of the reactive dyeing process of this invention, such dyed or printed cellulose fibers are represented by Formula VI above wherein "Fiber" represents a cellulose molecule deprived of a reactive hydrogen atom as originally present for example in hydroxy groups therein. It will be apparent that cross-linking exists, with resultant increased fastness properties when $n$ has a value of 2 or more.

In addition to cellulose and its derivatives, the process of this invention may be employed for dyeing other fibers containing reactive hydrogen atoms as present for example directly on a carbon, nitrogen or other atom in the linear chain of the fiber polymer, or in a free side group bonded directly or indirectly thereto such as —NRH, —SH, —OH, —CRRH, etc. The resulting dyeings may be ascribed formulae similar to those of the cellulose dyeings described above. As representative of such other fibers, there may be mentioned natural and synthetic proteinaceous fibers such as wool, silk, leather, animal hides and skins, casein, and zein, polyamides such as the 6-, and 6,6-nylons and polypyrrolidone, polyurethanes, polyesters, copolymers or homopolymers containing recurring carboxylic or cyano groups, polyvinyl alcohol, partially hydrolyzed cellulose acetate and polyvinyl acetate, polyvinyl chloride, and mixtures, copolymers and graft copolymers thereof. Mixed fabrics and fibers may likewise be so treated.

The fibers may be in any of the usual forms and in natural bulk, interwoven, knitted or felted form as for example in the form of a staple fiber or continuous filaments in bulk form or in the form of tow, rope, yarns, slubbings, warps, fabrics, felts, and the like, and treated as a wound package, running length, fibrous stock, bulk, etc. Further, although this invention has been described for use in the coloration of fibrous material, it will be understood that the process may be employed for dyeing other articles including film and sheet material, and other objects of any size, shape and configuration without departing from the spirit and scope of this invention.

The following examples are only representative of the present invention and are not to be regarded as limitative. All parts and proportions referred to herein and in the appended claims are by weight unless otherwise indicated.

*Example 1*

A diazonium chloride solution equivalent to 1.7 parts by weight sodium nitrite is prepared from the amine compound made by reducing the product of the reaction of 2 moles of potassium β-hydroxypropionate with 1 mole of 2,6-bis-chloromethyl-4-nitrotoluene as described in Example 2 of my said copending application S.N. (E-1588/A) and coupled cold with an NaOH alkaline solution of 10.4 parts by weight 60% paste of 1-(4-sulfophenyl)-3-methylpyrazalone-5(=6.25 parts 100%.).

The yellow dyestuff is precipitated by addition of NaCl and acidification with HCl. The isolated dyestuff has the structure:

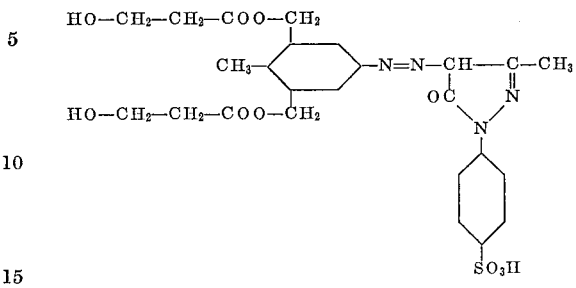

*Example 2*

The dyestuff obtained in Example 1 is introduced into 60 parts by volume conc. hydrochloric acid. After stirring under a reflux condenser at 72–75° C. for 2 hours the charge is allowed to cool to room temperature. The dyestuff is filtered off and washed with saturated NaCl solution. It has the same formula as shown in Example 1 except for replacement of the terminal OH groups by Cl.

Cotton cloth is padded with a soda alkaline solution of the above dyestuff, dried at 100° C., heat-cured at 150° C. for 3 minutes and soaped in boiling Igepal solution for 5 minutes. The cotton is dyed bright yellow of good tinctorial strength and good fastness properties as follows: AATCC wash Test No. 3, very good; perspiration, alkaline and acid, very good; crocking fastness, wet and dry very good; lightfastness 20 hours.

*Example 3*

A charge of 60 parts by volume conc. hydrochloric acid and 10 parts by weight, 2,6-bis(β-hydroxypropionatomethyl)-4-amino-toluene, the starting amine compound described in Example 1, is heated gradually to 72° C. under a reflux condenser within 40 minutes and then stirred at 72–75° C. for 2 hours. After cooling in an ice bath the crystallized reaction product is filtered off, washed with a little ice water and sucked down sharply. It is 2,6 - bis(β - chloropropionatomethyl)-4-amino-toluene hydrochloride of the formula:

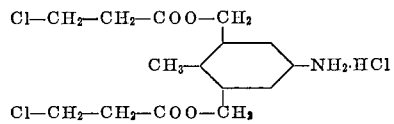

A sample of the wet cake of this product is diazotized requiring 3.5 parts by volume of 10% (weight/volume) sodium nitrite solution.

The diazonium compound is coupled cold with a sodium carbonate alkaline solution of 2.1 parts by weight 60% paste of 1-(4-sulfophenyl)-3-methylpyrazolone-5- (=1.3 parts by weight 100%).

The yellow dyestuff obtained is applied to cotton as described in Example 2. Shade and properties of the dyeings are identical with Example 2.

*Example 4*

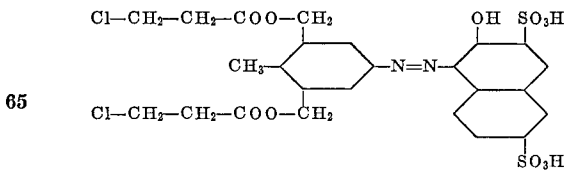

A sample of 2,6-bis(β - chloropropionatomethyl-4-amino-toluene hydrochloride is diazotized requiring 3,2- parts by volume 10% (weight/volume) sodium nitrite solution. The diazonium solution is coupled with a soda alkaline solution of 1.1 parts by weight 2-hydroxynaphthalene-3,6-disulfonic acid (R salt). The resulting dyestuff of the above formula is applied to cotton as described in Example 2. A wash-fast orange dyeing is obtained.

*Example 5*

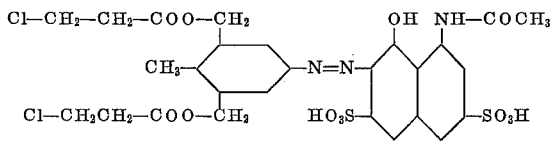

A sample of 2,6-bis(β - chloropropionatomethyl-4-amino-toluene hydrochloride is diazotized requiring 7.0 parts by volume 10% (weight/volume) sodium nitrite solution. The diazonium solution is coupled with the soda alkaline solution of the equivalent amount (mol:mol) of Acetyl H Acid (1-naphthol-8-acetylamino-3,6-disulfonic acid), to produce the above dyestuff yielding a vary bright, strong, washfast red dyeing on cotton by the method described in Example 2.

*Example 6*

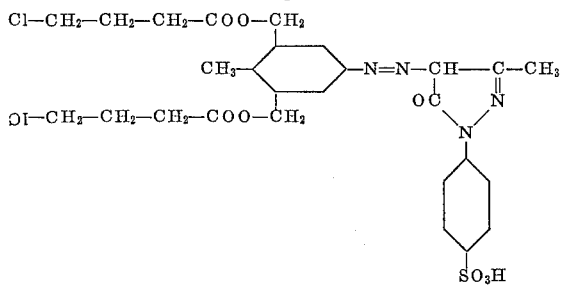

A sample of 2,6-bis(gamma-chlorobutyratomethyl)-4-amino-toluene hydrochloride, prepared as described in Example 5 of my said copending application, is diazotized requiring 6 parts by volume 10% (weight/volume) sodium nitrite solution. The diazonium solution is coupled with a soda alkaline solution of 3.7 parts by weight of a 60% paste of 1-(4-sulfophenyl)-3-methylpyrazolone-5 (=2.2 parts by weight 100%).

The resulting yellow dyestuff of the above formula is applied to cotton as described in Example 2 to produce a yellow dyeing with similar washfast and other properties.

*Example 7*

A sample of 2,6-bis(hydroxyacetatomethyl)-4-amino-toluene, prepared as described in Example 7 of my said copending application is diazotized requiring 12.0 parts by volume 10% (weight/volume) sodium nitrite solution. The diazonium solution is coupled with a sodium hydroxide alkaline solution of 7.4 parts by weight of a 60% paste of 1-(4-sulfophenyl)-3-methyl-pyrazolone-5 (=4.4 parts by weight 100%) and salted out with NaCl. The resulting yellow dyestuff has the structure:

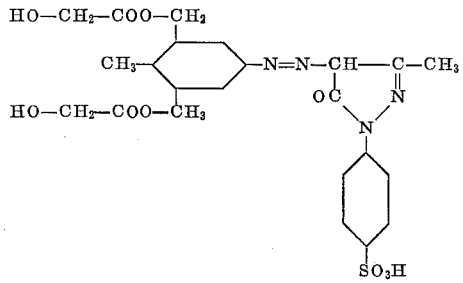

*Example 8*

A sample of the dyestuff of Example 7 is charged into a pressure container with 25 parts by volume conc. hydrochloric acid. The charge is heated under pressure at 100° C. for 1 hour. The crystallized dyestuff is isolated by filtration at room temperature. It has the same structure as that of Example 7 except for replacement of the terminal OH groups by Cl.

This product is applied to cotton as described in Example 2, and producing cotton dyed washfast yellow.

*Example 9*

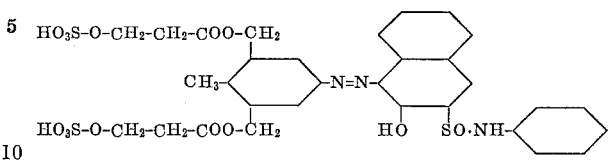

4.5 parts by weight of 2,6-bis(beta-hydroxypropionatomethyl)-4-aminotoluene, are introduced at below 20° C. into 10 parts by volume monohydrate (100% $H_2SO_4$). The charge is agitated at room temperature for 14 hours, drowned in ice and diazotized. The diazonium sulfate solution is coupled with a sodium hydroxide alkaline solution of 2.5 parts by weight Naphthol AS (3-hydroxy-2-naphthoic acid anilide).

The resulting dyestuff of the above structure is applied to cotton as described in Example 2, a washfast red dyeing being obtained.

The same dyestuff is obtained by postponing the sulfation step until after the diazotization and coupling.

This invention has been disclosed with respect to certain preferred embodiments and various modifications and variations thereof will become obvious to the person skilled in the art. It is to be understood that such modifications and variations are to be included within the spirit and scope of this invention.

I claim:
1. An organic dyestuff selected from the group consisting of azo, anthraquinone and phthalocyanine dyestuffs containing in the molecule at least one radical which is bonded to a nuclear carbon atom and which has the formula

$$-CH_2-OOC-(CHY)_m-X$$

wherein Y is selected from the group consisting of H and lower alkyl of 1 to 4 carbon atoms, m is an integer from 1 to 3, and X is selected from the group consisting of chloro and sulfato.

2. A dyestuff as defined in claim 1 also containing in the molecule an ionogenic water-solubilizing group selected from the group consisting of sulfonic, carboxylic, sulfato, sulfatoethoxy, and phosphatoethoxy.

3. A dyestuff as defined in claim 1 wherein X is Cl.
4. A dyestuff as defined in claim 1 wherein X is $OSO_3H$.
5. An anthraquinone dyestuff as defined in claim 1.
6. A phthalocyanine dyestuff as defined in claim 1.
7. An azo dyestuff as defined in claim 1.
8. A dyestuff as defined in claim 1 containing two of said radicals bonded in meta position relative to each other in the same benzene nucleus.
9. A dyestuff as defined in claim 7 containing two of said radicals bonded to a benzene nucleus carrying an azo bridge and both in meta position relative to said bridge.

References Cited by the Examiner

UNITED STATES PATENTS

| | | | |
|---|---|---|---|
| 1,886,480 | 11/1932 | Haller et al. | 8—54.2 X |
| 2,332,047 | 10/1943 | Bock et al. | 8—124 |
| 2,339,739 | 1/1944 | Blackshaw et al. | 8—54.2 |
| 2,350,188 | 5/1944 | Pinkney | 8—54.2 |
| 2,842,537 | 7/1958 | Strobel et al. | 260—163 |
| 2,906,747 | 9/1959 | Woldrum | 260—163 |
| 2,975,167 | 3/1961 | Schwander et al. | 260—199 |
| 3,084,166 | 4/1963 | Booth et al. | 260—163 X |
| 3,158,597 | 11/1964 | Blass et al. | 260—163 X |

CHARLES B. PARKER, *Primary Examiner.*

NORMAN G. TORCHIN, *Examiner.*

J. HERBERT, R. FINNEGAN, F. D. HIGEL,
*Assistant Examiners.*

UNITED STATES PATENT OFFICE
CERTIFICATE OF CORRECTION

Patent No. 3,278,515            October 11, 1966

Wilhelm Schmidt-Nickels

It is hereby certified that error appears in the above numbered patent requiring correction and that the said Letters Patent should read as corrected below.

Column 8, line 70, for "3,2-" read -- 3.2 --; column 10, lines 4 to 9, for the lower right-hand portion of the formula reading $$\overset{|}{S}O \cdot NH-$$      read      $$\overset{|}{C}O \cdot NH-$$

Signed and sealed this 10th day of September 1968.

(SEAL)
Attest:

Edward M. Fletcher, Jr.            EDWARD J. BRENNER
Attesting Officer            Commissioner of Patents